United States Patent [19]

Davis

[11] Patent Number: 4,670,598

[45] Date of Patent: * Jun. 2, 1987

[54] PROCESS FOR PREPARING (HYDROCARBYLTHIO)AROMATIC AMINES

[75] Inventor: Robert L. Davis, Baton Rouge, La.

[73] Assignee: Ethyl Corporation, Richmond, Va.

[*] Notice: The portion of the term of this patent subsequent to Jun. 10, 2003 has been disclaimed.

[21] Appl. No.: 796,201

[22] Filed: Nov. 8, 1985

[51] Int. Cl.$^4$ .......................................... C07C 149/42
[52] U.S. Cl. .................................... 564/440; 564/307; 564/335; 564/427; 564/428; 564/430; 546/290; 548/337; 548/484; 548/541
[58] Field of Search ............... 564/440, 307, 335, 427, 564/428, 430; 546/290; 548/337, 484, 541

[56] References Cited

U.S. PATENT DOCUMENTS 4,594,453  6/1986  Ramken et al. ..................... 564/440

Primary Examiner—Charles F. Warren
Assistant Examiner—John A. Sopp
Attorney, Agent, or Firm—Donald L. Johnson; John F. Sieberth; Patricia J. Hogan

[57] ABSTRACT

(Hydrocarbylthio)aromatic polyamines are prepared by reacting an aromatic polyamine, such as a diaminobenzene, with a hydrocarbyl disulfide, such as an alkyl disulfide, in the presence of an iodide or bromide of a metal other than an alkali metal as a catalyst.

10 Claims, No Drawings

PROCESS FOR PREPARING (HYDROCARBYLTHIO)AROMATIC AMINES

FIELD OF THE INVENTION

This invention relates to (hydrocarbylthio)aromatic polyamines and more particularly to a process for preparing them.

BACKGROUND

As disclosed in copending application Ser. No. 619,675 (Ranken et al.), filed June 11, 1984, now U.S. Pat. No. 4,594,453, it is known that various (hydrocarbylthio)aromatic amines are useful as intermediates in the preparation of polyurethanes, etc.; and they can be prepared by reacting an aromatic amine with a hydrocarbyl disulfide in the presence of a catalytic amount of a Lewis acid. The preferred catalysts of Ranken et al. are metal halides, such as aluminum chloride, boron trifluoride, boron trichloride, ferric chloride, and zinc chloride.

In the case of the diamines, it has been found that the preferred catalysts identified by Ranken et al. have the disadvantages of effecting the desired hydrocarbylthiations at too slow a rate to be completely satisfactory and of sometimes providing too low a yield of product.

SUMMARY OF THE INVENTION

An object of this invention is to provide a novel process for preparing (hydrocarbylthio)aromatic diamines.

Another object is to provide such a process wherein the products are prepared by the hydrocarbylthiation of aromatic polyamines in the presence of metal halide catalysts.

A further object is to provide such a process wherein the reaction rates and/or product yields are improved.

These and other objects are attained by reacting an aromatic polyamine with a hydrocarbyl disulfide in the presence of a catalytic amount of an iodide or bromide of a metal other than an alkali metal.

DETAILED DESCRIPTION

Aromatic polyamines utilizable in the practice of the invention are compounds having at least two amino groups attached to a carbocyclic or heterocyclic ring of an aromatic compound containing one or more simple and/or fused rings, such as benzene, naphthalene, anthracene, pyrrole, pyridine, indole, etc., rings. The compounds may bear no substituents other than the required amino groups, or they may bear substituents inert to the reaction conditions, such as chloro, fluoro, alkyl, alkoxy, alkylthio, aryl, aryloxy, arylthio, alkaryl, or aralkyl groups on any positions other than those to be substituted by hydrocarbylthio groups. In the case of coupled aromatic rings, the rings may be directly attached to one another or may be coupled through a bridge such as an oxygen, sulfur, sulfoxide, sulfone, alkyl, or other hydrocarbon link. Useful aromatic amines include, e.g., 1,5-diaminonaphthalene, 2,6-diaminopyridine, 1,2-diaminobenzene, 1,3-diaminobenzene, 1,4-diaminobenzene, 2,4-diaminotoluene, 2,6-diaminotoluene, 2,6-diamino-1-ethylbenzene, etc.

Hydrocarbyl disulfides which may be reacted with the aromatic polyamines include saturated and unsaturated aliphatic, cycloaliphatic, and aromatic disulfides in which the hydrocarbyl groups optionally bear inert, such as chloro, substituents. Exemplary of such compounds are methyl, ethyl, propyl, n-butyl, sec-butyl, t-butyl, 2-chloropentyl, cyclopentyl, cyclohexyl, phenyl, benzyl, p-tolyl, and p-chlorophenyl disulfides, etc. This component of the reaction mixture is generally employed in at least the stoichiometric amount required to yield the desired (hydrocarbylthio)aromatic amine, i.e., at least an equimolar amount being used when a mono(hydrocarbylthio)aromatic amine is desired, at least two molar equivalents being utilized when a di(hydrocarbylthio)aromatic amine is desired, etc.

The reaction of the aromatic polyamine with the hydrocarbyl disulfide is generally conducted at a temperature in the range of about 20°–300° C., preferably about 100°–200° C., and at a pressure of atmospheric up to about 1000 psi; and, as mentioned above, it is conducted in the presence of a catalytic amount of a metal iodide or bromide.

Metal iodides and bromides that can be used in the practice of the invention can be any of the known Lewis acid catalysts which are iodides or bromides of metals other than alkali metals, e.g., the ferrous, ferric, cuprous, cupric, zinc, cadmium, lead, cobaltous, mercurous, and mercuric iodides and bromides, etc. However, the preferred catalysts are the iodides, especially cuprous, ferrous, cobaltous, cadmium, and zinc iodides. The catalyst is employed in catalytic amounts, generally in a catalyst/aromatic amine mol ratio of about 0.01–0.5/1, preferably about 0.01–0.2/1.

In conducting the process of the invention, it is frequently preferred to (1) heat a mixture of the catalyst and aromatic polyamine at a suitable temperature, usually a temperature higher than the boiling point of the disulfide to be added, e.g., about 100°–150° C., until all of the catalyst has reacted and then (2) heat the reaction mixture at reflux temperature after the disulfide has been added to effect a hydrocarbylthiation process while removing evolved hydrocarbyl thiol by-product from the reaction vessel. However, it is also satisfactory to conduct the process by simply mixing the catalyst and reactants together and heating them to the reflux temperature. An inert solvent may be employed if desired but is unnecessary. Also, if desired, the metal iodide or bromide may be used in conjunction with another catalyst or a promoter, such as boron trifluoride etherate.

The process of the invention, like the process of Ranken et al., results in the formation of (hydrocarbylthio)aromatic amines which are useful as intermediates in the preparation of polyurethanes, etc. It is particularly advantageous in that it is characterized by higher reaction rates and/or higher yields than are obtained when the metal chlorides of Ranken et al. are used.

The following examples are given to illustrate the invention and are not intended as a limitation thereof.

COMPARATIVE EXAMPLE A

One molar proportion of commercial toluenediamine (c-TDA) —a material containing 80% 2,4-diaminotoluene and 20% 2,6-diaminotoluene—was heated with 0.065 molar proportion of aluminum chloride at 150° C. for one hour. Methyl disulfide was then added in sufficient excess to maintain the reaction temperature at 135° C., and the reaction was conducted for 39 hours to achieve 100% conversion of the c-TDA. Analysis of the product showed it to contain 16 mol% mono(methylthio) derivatives of c-TDA (MMTDA), 78 mol% di(methylthio) derivatives of c-TDA (DMTDA), and 6 mol% by-products.

EXAMPLE I

Each of seventeen reactions was conducted essentially as described in Comparative Example A except for substituting 0.05 molar proportion of another catalyst for the 0.065 molar proportion of aluminum chloride. The catalysts employed, the reaction times required, the conversions obtained, and the percentages of MMTDA and DMTDA in the final product are shown below.

| Metal | Time | Conversion | % Yield | |
|---|---|---|---|---|
| Halide | (Hrs.) | (%) | MMTDA | DMTDA |
| $FeBr_3$ | 22 | 90 | 56 | 43 |
| $FeBr_2$ | 22 | 98 | 39 | 61 |
| $FeI_2$ | 5 | 99 | 26 | 73 |
|  | 7 | 100 | 19 | 78 |
| $PbI_2$ | 7 | 94 | 50 | 50 |
| $Cu_2I_2$ | 10 | 100 | 5 | 94 |
| $Cu_2Br_2$ | 20 | 85 | 70 | 30 |
| $HgI_2$ | 10 | 100 | 11 | 87 |
| $Hg_2I_2$ | 10 | 100 | 16 | 81 |
|  | 13 | 100 | 8 | 88 |
| $CdI_2$ | 5 | 100 | 27 | 72 |
|  | 7 | 100 | 13 | 85 |
| $ZnBr_2$ | 14 | 87 | 78 | 23 |
| $ZnI_2$ | 20 | 98 | 29 | 68 |
| AgI | 17 | 61 | 92 | 8 |
| $CoI_2$ | 3.5 | 100 | 21 | 77 |
|  | 5 | 100 | 16 | 80 |

EXAMPLE II

Comparative Example A was essentially repeated except that 0.045 molar proportion of zinc bromide was substituted for the aluminum chloride and the reaction time was only 21 hours. The reaction resulted in 95% conversion, and analysis showed the product to contain 46 mol% MMTDA and 54 mol% DMTDA.

EXAMPLE III

Comparative Example A was essentially repeated except that 0.044 molar proportion of zinc iodide was substituted for the aluminum chloride and the reaction time was only 19 hours. The reaction resulted in 98% conversion, and analysis showed the product to contain 30 mol% MMTDA and 68 mol% DMTDA.

EXAMPLE IV

Comparative Example A was essentially repeated except that 0.02 molar proportion of zinc iodide and 0.033 molar proportion of boron trifluoride etherate were substituted for the aluminum chloride and the reaction time was only 20.5 hours. The reaction resulted in 100% conversion, and analysis showed the product to contain 12 mol% MMTDA and 86 mol% DMTDA.

COMPARATIVE EXAMPLE B

Comparative Example A was essentially repeated except that 0.05 molar proportion of boron trifluoride etherate was substituted for the aluminum chloride and the reaction was continued for only 7.5 hours, at which time it was terminated because of the substantial absence of any reaction.

It is obvious that many variations may be made in the products and processes set forth above without departing from the spirit and scope of this invention.

What is claimed is:

1. In a process for reacting an aromatic polyamine with a hydrocarbyl disulfide in the presence of a catalytic amount of a metal halide to form a (hydrocarbylthio)aromatic amine, the improvement which comprises conducting the reaction in the presence of an iodide or bromide of a metal other than an alkali metal as the halide.

2. The process of claim 1 wherein the aromatic polyamine is a diaminobenzene.

3. The process of claim 2 wherein the diaminobenzene is a diaminotoluene.

4. The process of claim 1 wherein the hydrocarbyl disulfide is an alkyl disulfide.

5. The process of claim 4 wherein the alkyl disulfide is methyl disulfide.

6. The process of claim 1 wherein the metal halide is zinc iodide.

7. The process of claim 1 wherein the metal halide is cuprous iodide.

8. The process of claim 1 wherein the metal halide is ferrous iodide.

9. Thee process of claim 1 wherein the metal halide is cadmium iodide.

10. The process of claim 1 wherein the metal halide is cobaltous iodide.

* * * * *